United States Patent [19]

Hinch

[11] Patent Number: 5,980,169

[45] Date of Patent: Nov. 9, 1999

[54] BRAD POINT DRILL BIT

[75] Inventor: Anthony G. Hinch, Washington County, Pa.

[73] Assignee: Fisch Precision TooL Co., Inc., Claysville, Pa.

[21] Appl. No.: 08/951,268

[22] Filed: Oct. 16, 1997

[51] Int. Cl.⁶ ..................................................... B23B 51/02
[52] U.S. Cl. ........................................... 408/225; 408/211
[58] Field of Search ................................... 408/225, 211, 408/212, 224

[56] References Cited

U.S. PATENT DOCUMENTS

| | | |
|---|---|---|
| 125,759 | 4/1872 | Richards . |
| 413,972 | 10/1889 | Shaler . |
| 631,572 | 8/1899 | Judson . |
| 750,537 | 1/1904 | Hanson . |
| 2,332,295 | 10/1943 | Bouchal .................................. 145/116 |
| 2,535,398 | 12/1950 | Economous .............................. 29/103 |
| 2,600,286 | 6/1952 | Weiland .................................. 145/117 |
| 4,050,841 | 9/1977 | Hildebrandt ............................. 408/213 |
| 4,222,690 | 9/1980 | Hosoi ....................................... 408/230 |
| 4,285,620 | 8/1981 | Luebbert et al. ....................... 408/212 |
| 4,330,229 | 5/1982 | Croydon .................................. 408/212 |
| 4,381,162 | 4/1983 | Hosoi ...................................... 408/1 R |
| 4,561,813 | 12/1985 | Schneider ............................... 408/230 |
| 4,625,593 | 12/1986 | Schmotzer ........................... 76/108 T |
| 5,092,719 | 3/1992 | Zsiger ..................................... 408/213 |
| 5,549,796 | 8/1996 | Durney .................................... 408/211 |

*Primary Examiner*—Daniel W. Howell
*Assistant Examiner*—Rouzbeh Tabaddor
*Attorney, Agent, or Firm*—Webb, Ziesenheim Logsdon Orkin & Hanson, P.C.

[57] ABSTRACT

A brad point drill bit having a boring tip defined by at least a pair of peripheral cutting members and a center blade disposed therebetween. The center blade is formed with a protruding central cutting edge for engaging a workpiece. The center blade also has two concave lateral cutting edges radially extending from the central cutting edge and rotationally offset therefrom. The peripheral cutting members comprise spurs having two cutting edges and pointed in a clockwise rotational direction of the drill bit.

15 Claims, 2 Drawing Sheets

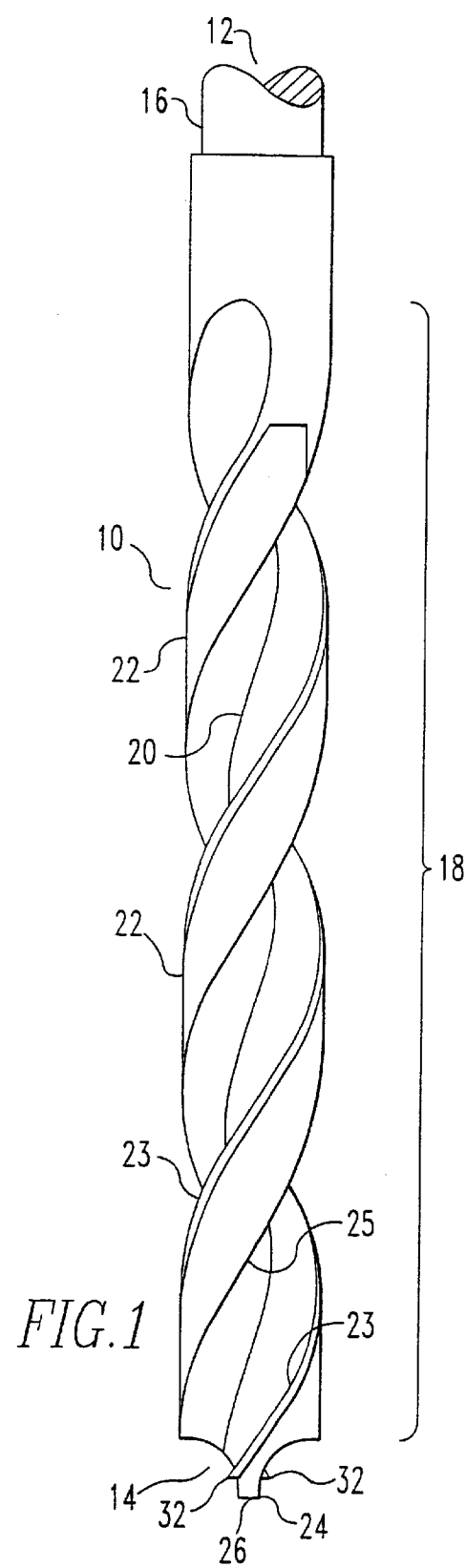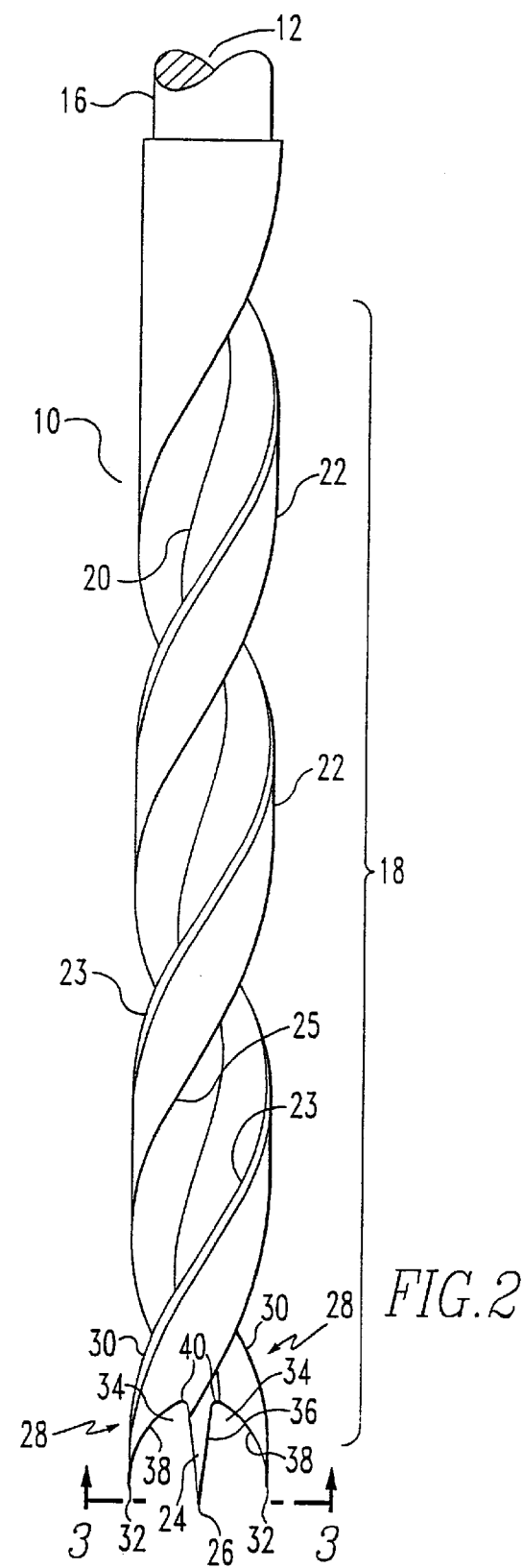
FIG.1
FIG.2

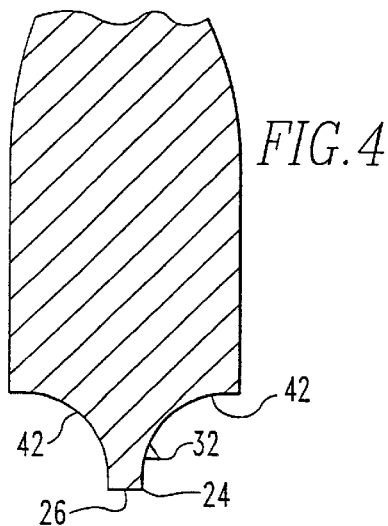
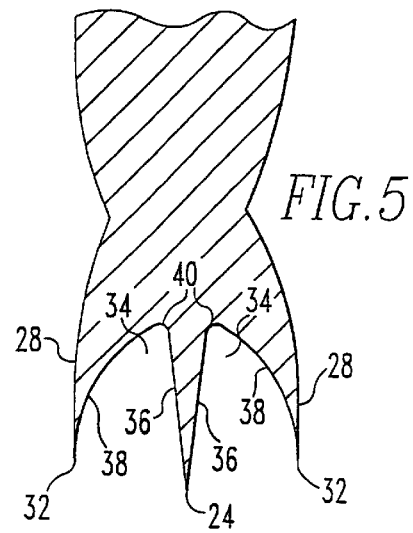
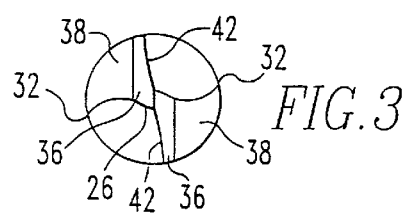
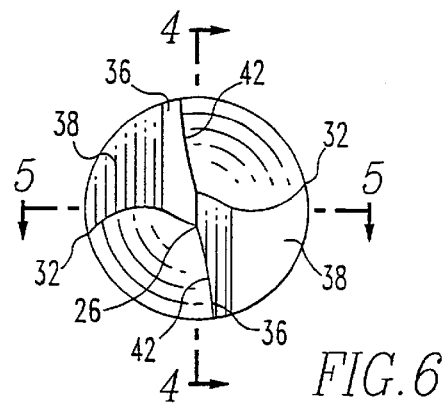
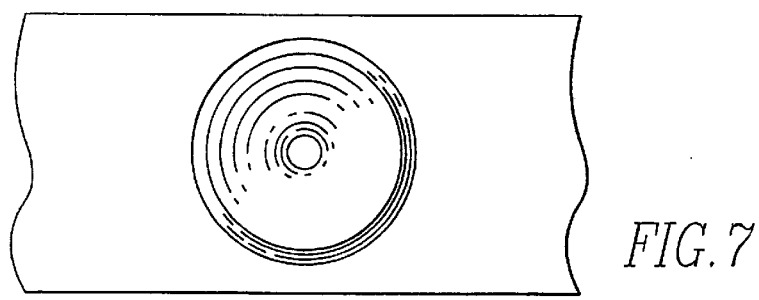
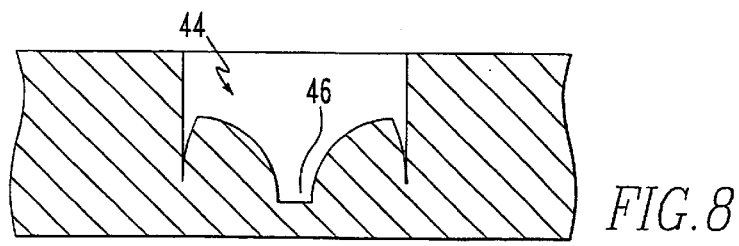

BRAD POINT DRILL BIT

BACKGROUND OF THE INVENTION

1. Field of the Invention

This invention relates generally to a drill bit for boring holes in wood, Corian, or other materials of similar hardness and, more particularly, to drill bits having peripheral cutting edges, known as brad point drill bits.

2. Description of Prior Art

Drill bits are widely employed for creating holes in wood, Corian, or other materials of similar hardness. Brad point drill bits for producing smooth-walled blind-holes or through-holes are especially well-known in the woodworking industry. Particularly, woodworkers use brad point drill bits to produce smooth bore through-holes or blind-holes for fitting finished wood pieces together (for example, by doweling). It is also well-known in the woodworking industry to introduce into bored blind-holes an adhesive material such as glue for securing a dowel within the bore.

Prior art drill bits, in general, have at their tip a pointed center portion which is the first element of the drill bit to engage a workpiece surface. A typical prior art drill bit, which has a spur located peripherally around the pointed center portion at the tip of the drill bit is illustrated in U.S. Pat. No. 4,050,841 to Hildebrandt. The disadvantage of this arrangement is that these center portions have a tendency to walk until the drill bit tip can establish penetration into the surface of the workpiece. Consequently, the precision of the hole location can be compromised, or the workpiece surface can be damaged.

Another disadvantage of prior art drill bits, generally, is that cut chips are guided by the cutting edges of the drill bit into narrow spaces defined by the helical grooves on the flute portion of the drill bit shaft or, alternatively, in a cavity at the tip of the drill bit formed between the pointed center portion and peripherally spaced spurs. Chips can accumulate in these spaces and become impacted, making clean-out difficult and time consuming. Additionally, the build-up of chip material in these spaces can damage the tip of the drill bit.

It is therefore an object of this invention to provide a drill bit which, when engaged with the surface of a workpiece, will prevent the tip of the drill bit from walking. It is also an object of this invention to provide a drill bit with peripheral cutting members.

It is a further object of this invention to provide lateral cutting edges, extending from a central cutting edge, to regrind chips produced by the drill bit into smaller particulate matter for easier clean-out from the drill bit shaft.

SUMMARY OF THE INVENTION

The foregoing objectives and related advantages may be accomplished with a drill bit of the type disclosed hereafter. Particularly, we have invented a drill bit for boring holes in wood, Corian or materials of similar hardness in which a center blade is disposed between at least a pair of peripheral cutting members. The center blade has a central cutting edge positioned substantially in a plane which bisects the drill bit along its longitudinal axis. The center blade also has lateral cutting edges radially extending from the central cutting edge and longitudinally spaced therefrom. Each lateral cutting edge may be rotationally offset from the central cutting edge, and the lateral cutting edges may have a concave profile.

The peripheral cutting members may be in the form of spurs pointed in a clockwise rotational direction of the drill bit. The spurs may each have two cutting edges, the cutting edges of each spur converging to form a spur point.

Further details and advantages of the invention will become apparent from the following detailed description, in conjunction with the drawings, wherein like reference numerals represent like parts.

BRIEF DESCRIPTION OF THE DRAWINGS

FIG. 1 is a side elevation view of the drill bit according to the present invention;

FIG. 2 is a side elevation of the drill bit of FIG. 1, rotated 90°;

FIG. 3 is an end view of the tip of the drill bit of FIG. 1;

FIG. 4 is a schematic cross-section view taken along a longitudinal plane passing through the center of the drill bit of FIG. 1;

FIG. 5 is a schematic cross-section view taken along a longitudinal plane passing through the center of the drill bit of FIG. 2;

FIG. 6 is an enlarged end view of the tip of the drill bit of FIG. 1 with surface shading;

FIG. 7 is a top view of a workpiece with surface shading showing an irregularly shaped blind-hole bored by the drill bit of FIG. 1; and FIG. 8 is a schematic cross-section of a workpiece showing an irregularly shaped blind-hole bored by the drill bit of FIG. 1, including an internal pocket formed by the drill bit.

DETAILED DESCRIPTION OF THE PREFERRED EMBODIMENT

A drill bit of the present invention is generally designated 10 in FIGS. 1–6 of the drawings. Referring to FIG. 1, the drill bit 10 has a cylindrical shaft 12 having two ends, one end being a boring tip 14 and the other end being a shank end 16 sized for mating with a power or hand drill apparatus (not shown). A fluted portion 18 extending along the shaft 12 has longitudinally formed helical grooves 20 defined between a plurality of flutes 22. Each flute 22 has a flute cutting edge 23 and a trailing edge 25. The fluted portion 18 separates the boring tip 14 and the shank end 16.

A center blade 24 with a central cutting edge 26 is located at the boring tip 14. The center blade 24 is substantially in axial alignment with an axis of rotation of the drill bit 10. The central cutting edge 26 is positioned substantially in a plane which bisects the drill bit 10 along a longitudinal axis of the drill bit 10. In the preferred embodiment of the invention, the center blade 24 is formed such that the central cutting edge 26 protrudes axially from the boring tip 14 of the drill bit 10.

Referring to FIG. 2, the boring tip 14 is defined by at least a pair of peripheral cutting members 28 having the center blade 24 disposed therebetween. The peripheral cutting members 28 each have two cutting edges 30 located on lateral opposite sides of the peripheral cutting members 28, thereby permitting the drill bit 10 to bore through-holes or blind-holes in a clockwise direction around the axis of rotation of the drill bit. In the preferred embodiment of the invention, the peripheral cutting members 28 are formed as spurs, as indicated in FIGS. 2 and 5. Each spur also has two cutting edges 30 which converge to form a spur point 32. The spur points 32 are pointed in a clockwise rotational direction of the drill bit 10, as shown in FIG. 1.

As illustrated in FIGS. 2 and 5, the center blade 24 is separated from each cutting member 28 by a V-shaped notch 34. The V-shaped notch 34 has internal opposing faces 36 and 38. The internal opposing faces 36 and 38 meet at root point 40 of the V-shaped notch 34. The V-shaped notch 34 may be provided with an interior angle between internal opposing faces 36 and 38 of between 55° and 65°. However, in the preferred embodiment of the invention, the V-shaped notch will have an interior angle of 60°. Referring to FIGS. 3 and 6, internal opposing faces 36 and 38 are substantially planar.

Referring to FIG. 4, the center blade 24 has lateral cutting edges 42 extending from the central cutting edge 26. Referring to FIGS. 3 and 6, the lateral cutting edges radially extend outward from the central cutting edge 26 and are rotationally offset therefrom. In the preferred embodiment of the invention, as illustrated in FIG. 4, the lateral cutting edges 42 define a concave profile and arcuately extend from the central cutting edge 26 and are longitudinally spaced therefrom.

The drill bit 10 of the present invention is made of carbon-alloy steel capable of withstanding temperatures of up to 640° F. Additionally, the drill bit 10 of the present invention has a rotational operating speed of between 2,000 and 3,000 revolutions per minute.

In operation, the drill bit of the invention produces a bore seat of irregular cross-section. The resulting bore seat 44 is illustrated in FIGS. 7 and 8. The central cutting edge 26 of the center blade 24 bores an internal pocket 46 capable of receiving an adhesive material, such as glue, as shown in FIG. 8. This is advantageous in doweling, as will be appreciated by those skilled in the art. Further, in operation, the drill bit of this invention can produce smooth-bore throughholes with minimal splintering due to the combination of peripheral cutting members 28 with a center blade 24 having a central cutting edge 26.

Finally, the lateral cutting edges of the present invention are effective to regrind chips produced by the drill bit 10 in operation. This small particulate matter provides for easier clean-out from the helical grooves 20 on the shaft 12 of drill bit 10.

While the preferred embodiment and presently known best mode of the invention have been described above, various modifications and variations of the invention may be made without departing from the spirit and scope of the invention.

Having described the invention, what is claimed is:

1. A drill bit comprising a shaft with a tip, the tip defined by at least a pair of peripheral cutting members and a center blade disposed between the cutting members, said center blade having a central cutting edge positioned substantially in a plane which bisects said drill bit along a longitudinal axis of the drill bit, said center blade further having lateral cutting edges arcuately extending from said central cutting edge and longitudinally spaced therefrom.

2. The drill bit of claim 1 wherein the cutting members are spurs peripherally located on the shaft at the tip and pointed in a clockwise rotational direction of said drill bit.

3. The drill bit of claim 2 wherein each spur has two cutting edges.

4. The drill bit of claim 3 wherein the cutting edges of each spur converge to form a spur point.

5. The drill bit of claim 1 wherein the central cutting edge protrudes axially from the tip of the drill bit.

6. The drill bit of claim 1 wherein the center blade has two lateral cutting edges having a concave profile, each lateral cutting edge rotationally offset from said central cutting edge.

7. The drill bit of claim 1 wherein the drill bit is made of a carbon-alloy steel capable of withstanding temperatures of up to 640° F.

8. The drill bit of claim 1 formed to rotate at a speed of between 2000 and 3000 revolutions per minute.

9. A drill bit comprising a cylindrical shaft with helical grooves and a boring tip, the boring tip defined by at least a pair of peripheral cutting members and a center blade disposed between the cutting members, said center blade having a central cutting edge positioned substantially in a plane which bisects said drill bit along a longitudinal axis of the drill bit and protruding axially from the tip of the drill bit, said center blade also having two lateral cutting edges arcuately extending from the central cutting edge, said cutting members comprising spurs peripherally located on the shaft at the boring tip and pointed in a clockwise rotational direction of said drill bit.

10. The drill bit of claim 9 wherein each spur has two cutting edges.

11. The drill bit of claim 10 wherein the cutting edges of each spur converge to form a spur point.

12. The drill bit of claim 11 wherein the spur points are pointed in a clockwise rotational direction of the drill bit.

13. The drill bit of claim 9 wherein the lateral cutting edges have a concave profile, each lateral cutting edge and rotationally offset from said central cutting edge.

14. The drill bit of claim 9 wherein the drill bit is made of a carbon-alloy steel capable of withstanding temperatures of up to 640° F.

15. A drill bit comprising a cylindrical shaft with helical grooves and a boring tip, the boring tip defined by at least a pair of peripheral cutting members and a center blade disposed between the cutting members, said center blade having a central cutting edge positioned substantially in a plane which bisects said drill bit along a longitudinal axis of the drill bit, said central cutting edge protruding axially from the boring tip of the drill bit, said center blade further having two lateral cutting edges of concave profile radially extending from the central cutting edge, each lateral cutting edge rotationally offset from said central cutting edge, said peripheral cutting members comprising spurs pointed in a clockwise rotational direction of said drill bit, each spur having two cutting edges.

\* \* \* \* \*

UNITED STATES PATENT AND TRADEMARK OFFICE
CERTIFICATE OF CORRECTION

PATENT NO. : 5,980,169
DATED : November 9, 1999
INVENTOR(S) : Anthony G. Hinch

It is certified that error appears in the above-identified patent and that said Letters Patent is hereby corrected as shown below:

Title Page, [75] Inventor, "Washington County" should read
--West Alexander--.

Title Page, [73] Assignee, "TooL" should read --Tool--.

Title Page, [56] References Cited, last reference:
"5,549,796" should read --5,649,796--.

Signed and Sealed this

Fifteenth Day of August, 2000

Attest:

Q. TODD DICKINSON

Attesting Officer     *Director of Patents and Trademarks*